No. 684,871. Patented Oct. 22, 1901.
A. M. RUST.
APPARATUS FOR REGULATING AND CONTROLLING MARINE ENGINES.
(Application filed Nov. 24, 1899.)
(No Model.)

Witnesses
Henry J. Baydle
George W. Cox

Inventor
Alexander Mearns Rust

UNITED STATES PATENT OFFICE.

ALEXANDER MEARNS RUST, OF AUCKLAND, NEW ZEALAND.

APPARATUS FOR REGULATING AND CONTROLLING MARINE ENGINES.

SPECIFICATION forming part of Letters Patent No. 684,871, dated October 22, 1901.

Application filed November 24, 1899. Serial No. 738,220. (No model.)

*To all whom it may concern:*

Be it known that I, ALEXANDER MEARNS RUST, a subject of the Queen of Great Britain and Ireland, residing at 103 Queen street, Auckland, in the provincial district of Auckland, in the Colony of New Zealand, have invented new and useful Improvements in Apparatus for Regulating and Controlling Marine Engines, of which the following is a specification.

The essential feature of my invention consists in the utilization of the pitching motion of a vessel to automatically operate a valve regulating and controlling the admission of steam to the engines. A weight pivotally supported in the manner of a pendulum is arranged to swing with the longitudinal pitching motion of the vessel, suitable guides provided with rollers or other antifriction device being employed to prevent or limit transverse vibration of the weight. A rod on which the weight is suspended may be directly connected to the spindle of a valve of the wing or butterfly type within the steam-supply pipe, or a tooth-quadrant upon said rod may gear with tooth-wheels, whereby the motion of the weight may be used to revolve the spindle of a screw-operated valve.

My invention may be adapted to nearly every kind of valve, and in some cases it may be advisable to use an equilibrium-valve, so that the weight has no steam-pressure to overcome. The weight is adjustable upon the suspending rod, so that varying degrees of "cut-off" may be obtained, and a slotted link or levers or other equivalent analogous contrivance is employed, whereby when desired the weight may have a certain amount of lost motion—that is, it may swing within certain adjustable limits without operating the valve. Springs may be used upon the suspending rod and at the limits of the vibration of the weight to bring it to rest without jar or shock to the mechanism. What is known as "dashpot" or "cataract" gear, consisting of a piston working in a cylinder containing oil, may be used to check the motion of the weight when the vessel is violently pitching, the oil in said cylinder passing from one side of the piston to the other through ports connected by a pipe provided with a valve, the opening of which may be regulated to check the flow of oil and retard the motion of the piston, which has a projecting rod engaged by the weight when near the limit of its vibration.

Figure 1:
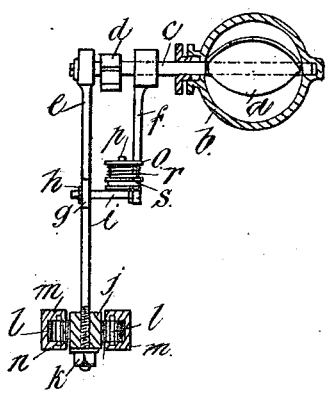
Figure 2:
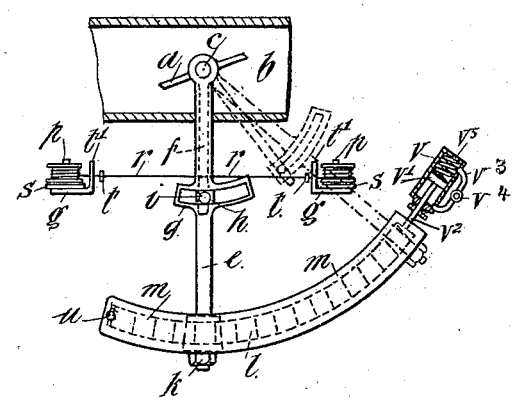

Referring to the accompanying drawings, Figure 1 is an end and Fig. 2 a side elevation, both views being partly in section for clearer illustration.

Referring to the figures, the throttle-valve $a$ is in the form of a disk and designed when in one position to close the steam-pipe $b$. The valve-spindle $c$ passes through bearing $d$ and has a pendulum-rod $e$ journaled upon its outer end and a lever $f$ fixed upon it. The pendulum-rod $e$ is formed with a slotted quadrant $g$, in which slides the motion-block $h$, receiving the pin $i$, projecting from lever $f$. The weight $j$ upon the lower end of the pendulum-rod is secured thereon by a nut $k$ and is guided between rollers $l$, carried in an arc-shaped guide $m$, the rollers having spindles $n$ journaled in the guide. Drums $o$ are journaled upon spindles $p$ in the brackets $q$, one upon either side of lever-arm $f$, to which they are connected by cords $r$, which tend to coil upon the drums when the latter are revolved by coil-springs $s$, one beneath and operating each drum. The springs of the drums are so adjusted that the lever $f$ is normally kept in a vertical position, with the throttle-valve open for the full passage of steam, and a stop $t$ upon each cord comes in contact with an extension $t'$ upon the bracket $q$ and prevents the lever from being drawn too much upon either side should one spring be stronger than the other. The slotted quadrant may be so proportioned that the downward motion of the stern of the vessel has no effect in operating the valve, while the valve may either commence to operate immediately the stern of the vessel begins to rise or after it has reached a certain position. The limit of the vibration of the weight may be adjusted by a top bolt $u$, passed through the guide, or a cataract-buffer may be used, consisting of a cylinder $v$, in which works a piston $v'$ upon a rod $v^2$. A pipe $v^3$ connects ports at either end of the cylinder, so that oil contained therein passes from one side of the piston to the other when said piston is reciprocated. A cock $v^4$ upon the pipe $v^3$ can be adjusted to check the flow of oil and bring the weight $j$ gradually to rest when the rod $v^2$ is engaged by it when nearing the limit of its vibration. A spring $v^5$ normally tends to project the rod into the path of the weight.

What I claim as my invention, and desire to secure by Letters Patent, is—

1. In an apparatus for controlling marine engines, the combination with the throttle-valve and its spindle, of a weighted pendulum journaled on the spindle thereof, a slotted quadrant carried by said pendulum and an arm rigidly secured to said spindle and having a pin movably held in the slot of the quadrant and tension devices connected to said lever, substantially as described.

2. In an apparatus for controlling marine engines, the combination with the throttle-valve and its spindle, of a weighted pendulum journaled on the spindle thereof, a slotted quadrant carried by said pendulum and an arm rigidly secured to said spindle and having a pin movably held in the slot of the quadrant, spring-drums, one upon each side of the lever, cords coiled upon said drums and connected to the lever, and stop devices for limiting the operation of the spring-drums, substantially as described.

3. The combination in apparatus for regulating and controlling marine engines of a weight supported upon a pendulum-rod operating a valve whereby the admission of steam to the engine is controlled a quadrant-bracket forming lateral guides for said weight and means for stopping the weight without shock when it has reached the limit of its vibration said means consisting of a cylinder provided with a piston having a projecting rod designed to be struck by said weight and a spring within the cylinder for operating the piston and projecting the rod substantially as and for the purposes herein described and illustrated.

4. The combination in apparatus for regulating and controlling marine engines of a weight supported upon a pendulum-rod operating a valve whereby the admission of steam to the engine is controlled a quadrant-bracket forming lateral guides for said weight and means for stopping the weight without shock when it has reached the limit of its vibration said means consisting of a cylinder provided with a piston having a projecting rod designed to be struck by said weight and a spring within the cylinder for operating the piston and projecting the rod a pipe connecting ports in the cylinder upon both sides of the piston and a tap in said pipe whereby the escape of fluid from one side of the piston to the other is regulated substantially as and for the purposes herein described and illustrated.

Signed in the provincial district of Auckland this 29th day of September, 1899.

ALEXANDER MEARNS RUST. [L. S.]

Witnesses:
   E. BROOKE-SMITH,
   FRANK DILLINGHAM.